(12) United States Patent
Blocquel

(10) Patent No.: US 7,692,114 B2
(45) Date of Patent: Apr. 6, 2010

(54) METHOD AND DEVICE FOR PRODUCING AN INTERNAL THREAD BY AUTOMATICALLY MACHINING IN A BORE

(75) Inventor: Alain Blocquel, Dardilly (FR)

(73) Assignee: Areva NP, Courbevoie (FR)

( * ) Notice: Subject to any disclaimer, the term of this patent is extended or adjusted under 35 U.S.C. 154(b) by 678 days.

(21) Appl. No.: 10/592,053

(22) PCT Filed: Feb. 23, 2005

(86) PCT No.: PCT/FR2005/000430

§ 371 (c)(1),
(2), (4) Date: Sep. 8, 2006

(87) PCT Pub. No.: WO2005/097388

PCT Pub. Date: Oct. 20, 2005

(65) Prior Publication Data

US 2007/0080145 A1 Apr. 12, 2007

(30) Foreign Application Priority Data

Mar. 10, 2004 (FR) .................................. 04 02500

(51) Int. Cl.
*B23K 9/00* (2006.01)
*B23H 1/08* (2006.01)
*B23H 1/10* (2006.01)
*B23H 5/00* (2006.01)
*B23H 9/00* (2006.01)
*B23H 1/02* (2006.01)

(52) U.S. Cl. .............. 219/69.11; 219/69.14; 219/69.17; 219/69.18

(58) Field of Classification Search .............. 219/69.11, 219/69.14, 69.18, 69.2, 69.17
See application file for complete search history.

(56) References Cited

U.S. PATENT DOCUMENTS

| 2,650,979 | A | | 9/1953 | Teubner | |
|---|---|---|---|---|---|
| 2,773,968 | A | | 12/1956 | Martellotti et al. | |
| 3,657,507 | A | | 4/1972 | McNeece | |
| 4,104,501 | A | * | 8/1978 | Wyss | 219/69.17 |
| 4,161,641 | A | * | 7/1979 | Bonga | 219/69.17 |
| 4,453,071 | A | | 6/1984 | Oizumi et al. | |
| 5,225,645 | A | * | 7/1993 | Overbay et al. | 219/69.11 |
| 5,904,865 | A | * | 5/1999 | Jariabek | 219/69.13 |

* cited by examiner

*Primary Examiner*—Tu B Hoang
*Assistant Examiner*—Lindsey C Teaters

(57) ABSTRACT

The invention relates to a method for producing a thread in a bore (2) by remote automatic machining characterized in that the method consists in introducing into the bore (2) an electrode (11) provided with a thread (20) whose shape and dimensions are pre-determined according to the shape and dimensions of an inside thread to be produced, in machining the internal threads by electroerosion displacing the electrode (11) in an orbital manner in the bore (2) according to a predetermined number of operations and in adjusting the machining parameters according to each operation. A device for carrying out said method is also disclosed.

8 Claims, 3 Drawing Sheets

METHOD AND DEVICE FOR PRODUCING AN INTERNAL THREAD BY AUTOMATICALLY MACHINING IN A BORE

This application is the National Stage of International Application No. PCT/EP2005/000430 filed on Feb. 23, 2005; and this application claims priority of Application No. 0402500 filed in France on Mar. 10, 2004 under 35 U.S.C. § 119; the entire contents of all are hereby incorporated by reference.

The present invention relates to a method and apparatus for making an internal thread or "tapping" in a bore by automatic machining under remote control.

In installations in a hostile medium, such as nuclear reactors for example, it is necessary to undertake actions, and in particular to perform machining, which, given the medium, must necessarily be performed under remote control.

One of the techniques commonly used for performing machining in that type of environment is machining by electroerosion. This applies in particular when making a tapping in a part, where it is known to use an electrode that is screwed into a bore.

In that method, the electrode, which has a profile similar to that of the screw that is to be engaged subsequently in the tapping that is being made, is itself driven with helical movement corresponding to its pitch. That movement is communicated thereto by a special electroerosion head that includes in particular a lead screw having the same pitch.

Although that method is relatively simple to implement, it presents drawbacks, in particular when the tapping is to be performed in a bore that is blind and shallow.

Under such circumstances, only the entry threads to the tapping being made present a profile close to the profile that is to be obtained, while the threads remote from the entry to the tapping present a profile that becomes progressively less good, such that the tapping becomes more or less conical. This geometrical departure is due essentially to wear of the electrode that takes place progressively as the electrode advances in the bore.

Furthermore, in order to perform tapping using that method, it is possible to use only one rate of machining, either a roughing rate that saves on machining time but that gives a mediocre surface state liable to present a surface with microcracking, or else a finishing rate that gives a good surface state, but that leads to machining times that are prohibitive and to greater amounts of wear, having an even greater effect on the final geometrical shape of the tapping.

In addition to those drawbacks, another drawback of that method lies in the fact that in the event of any failure of the system for moving the electrode during the tapping operation, it is necessary to use another system to unscrew the electrode and disengage it from the bore, at the risk of damaging the thread that has already been tapped in the bore.

Finally, that method requires an electrode drive system to be available that is adapted to each pitch value as a function of the thread in the tapping to be made.

U.S. Pat. No. 2,773,968 discloses a device for machining by electroerosion to drill a hole and/or to perform tapping. That device comprises an electrode provided with threads of shape and dimensions that are determined as a function of the shape and the dimensions of the threads that are to be obtained. The electrode is driven in planetary rotation movement about an axis corresponding to the axis of the orifice that is to be obtained and also with movement of rotation about its own axis. Those two movements are coordinated with an advance movement in order to perform tapping.

In that case likewise, the profile of the threads is not constant over the entire length of the tapping.

The invention seeks to propose a method and apparatus for tapping in a wall by automatic machining under remote control that enables the above-mentioned drawbacks to be overcome.

The invention thus provides a method of making tapping in a bore by remotely controlled automatic machining, the method being characterized by the following steps:
inserting into the bore an electrode provided with threads of shape and dimensions that have previously been determined as a function of the shape and the dimensions of the threads of the tapping that is to be obtained;
machining the threads of the tapping by electroerosion while displacing the electrode in orbital manner inside the bore without the electrode rotating about its own axis, and performing a predetermined number of passes; and
adjusting the machining parameters as a function of each pass that is to be performed.

According to other characteristics of the invention:
all of the passes are performed using a single electrode having threads of shape and dimensions that are determined so as to take account of the wear to which they are subjected during said passes in order to obtain the desired threads for the tapping;
the set of passes comprises:
a pre-blanking pass;
a blanking pass; and
at least one finishing pass;
the machining parameters during said passes are adjusted by modifying at least the magnitude and the duration of the current pulses and the depth of the pass of the electrode; and
during each pass, and simultaneously with the orbital displacement of the electrode, pulsing movements are applied to said electrode radially relative to the bore.

The invention also provides apparatus for making tapping in a bore by remotely controlled automatic machining, the apparatus being characterized in that it comprises:
an electrode provided with threads of shape and dimensions that are previously determined as a function of the shape and the dimensions of the threads in the tapping to be obtained;
means for orbitally displacing said electrode in the bore without it revolving about its own axis; and
means for feeding electricity to the electrode and for circulating a fluid between the bore and said electrode.

According to other characteristics of the invention:
the electrode presents a diameter that is smaller than the diameter of the bore;
the electrode includes an axial channel for circulating the fluid by injection or by suction;
the fluid is a dielectric fluid, such as demineralized water, for example.

The invention can be better understood on reading the following description given by way of example and made with reference to the accompanying drawings, in which.

Figure 1:
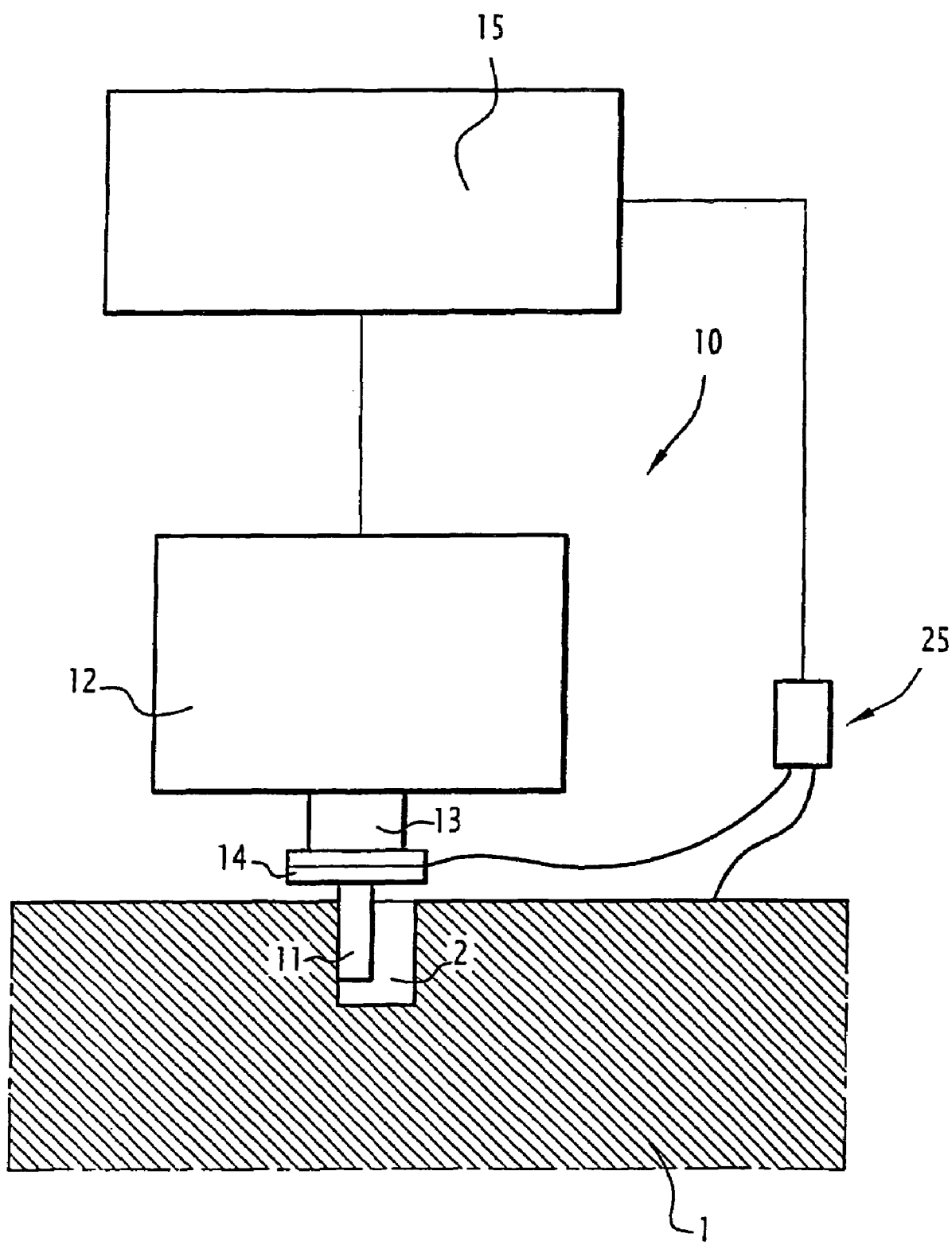
FIG. 1 is a diagrammatic elevation view of a device in accordance with the invention for making an inside thread.

FIG. 1 is a diagram showing a part 1, e.g. a primary nozzle dam of a steam generator in a nuclear power station that includes a bore 2 in which tapping needs to be restored by means of apparatus for making an inside thread and given overall reference 10.

As shown in FIG. 1, the apparatus 10 comprises an electrode 11 carried by a machining head 12 via an electrode carrier 13. The electrode carrier 13 may be fitted with a ring 14 enabling the vertical displacement of the electrode to be limited beyond a displacement that is to be reached so as to avoid any overrun and guarantee that the tapping obtained in the bore 2 has the required depth. The machining head 12 is a head having two displacement axes X and Y so as to be able to transmit determined movement to the electrode 11, as explained below.

The machining head 12 is connected to a control unit given reference 15.

Figure 2:
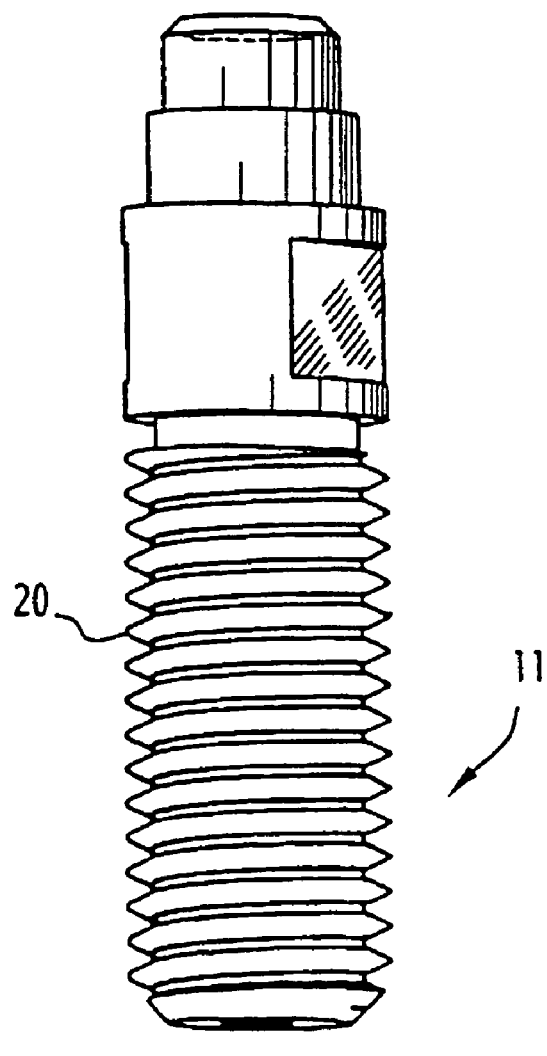
FIG. 2 is a perspective view of an electrode of the device in accordance with the invention.
Figure 3:
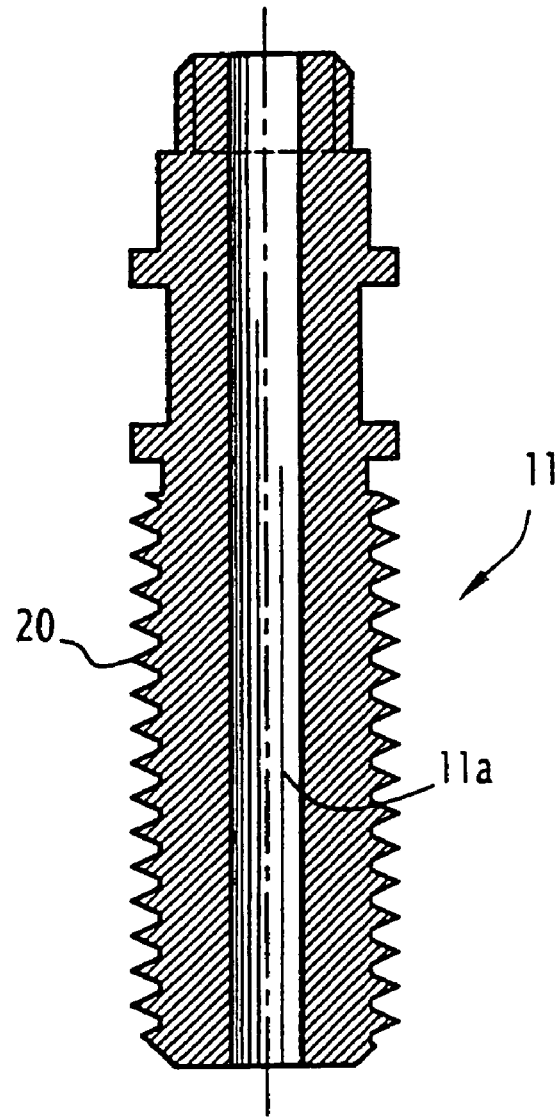
FIG. 3 is an axial section view of the electrode of the device in accordance with the invention.

As shown in FIGS. 2 and 3, the electrode 11 has threads 20 of shape and dimensions that are previously determined as a function of the shape and dimensions of the threads of the tapping that is to be obtained in the bore 2. In general, the diameter of the crest of the thread on the electrode 11 is equal to the diameter at the root of the thread of the tapping in the bore 2 minus 1 millimeter (mm). The profile of the threads 20 of the electrode 11 is determined so that the electrode can form the tapping in the bore 2 completely by electroerosion in a predetermined number of passes, and so that the profile makes allowance for the various rates of wear during each machining pass so as to reach, at the end of the last finishing pass, the profile that is to be obtained for the tapping without it being necessary to change electrode while machining is taking place.

Preferably, the electrode 11 is made of a "cuprotungsten" alloy. It could also be made of graphite, copper, or indeed out of alloys of molybdenum, and more generally out of any material that conductors electricity.

The apparatus 10 also has electrical feed means 25 connected to the control unit 15, and the electrode 11 is connected to the positive terminal while the part 1 is connected to the negative terminal, as shown in FIG. 1. The apparatus 10 also has means for causing a fluid to circulate between the bore 2 and the electrode 11, said fluid being a dielectric fluid, such as dimineralized water, for example. For this purpose, and as shown in FIG. 3, the electrode 11 is provided with an axial channel 11a along which the fluid can flow. The fluid is circulated by being injected via the axial channel 11a in the electrode 11 or by being sucked up by conventional means (not shown).

In order to facilitate movement of the fluid in the zone where the tapping is being machined by the electrode 11, and in order to be sure of evacuating the particles electroeroded by the tapping operation, the electrode 11 can be driven via the machining head 12 with pulsating movement extending radially relative to the bore and serving to alternate regularly between periods of machining and periods in which said electrode 11 is being withdrawn.

The method of making the tapping in the bore 2 takes place as follows.

Initially, the electrode 11 that is of diameter smaller than the diameter of the bore 2 is inserted into the bore and then the threads on the tapping of said bore 2 are machined by electroerosion by moving the electrode 11 inside the bore in orbital manner by means of the machining head 12 over a predetermined number of passes, and the machining parameters are set as a function of each of the passes that is to be performed.

Figure 4:
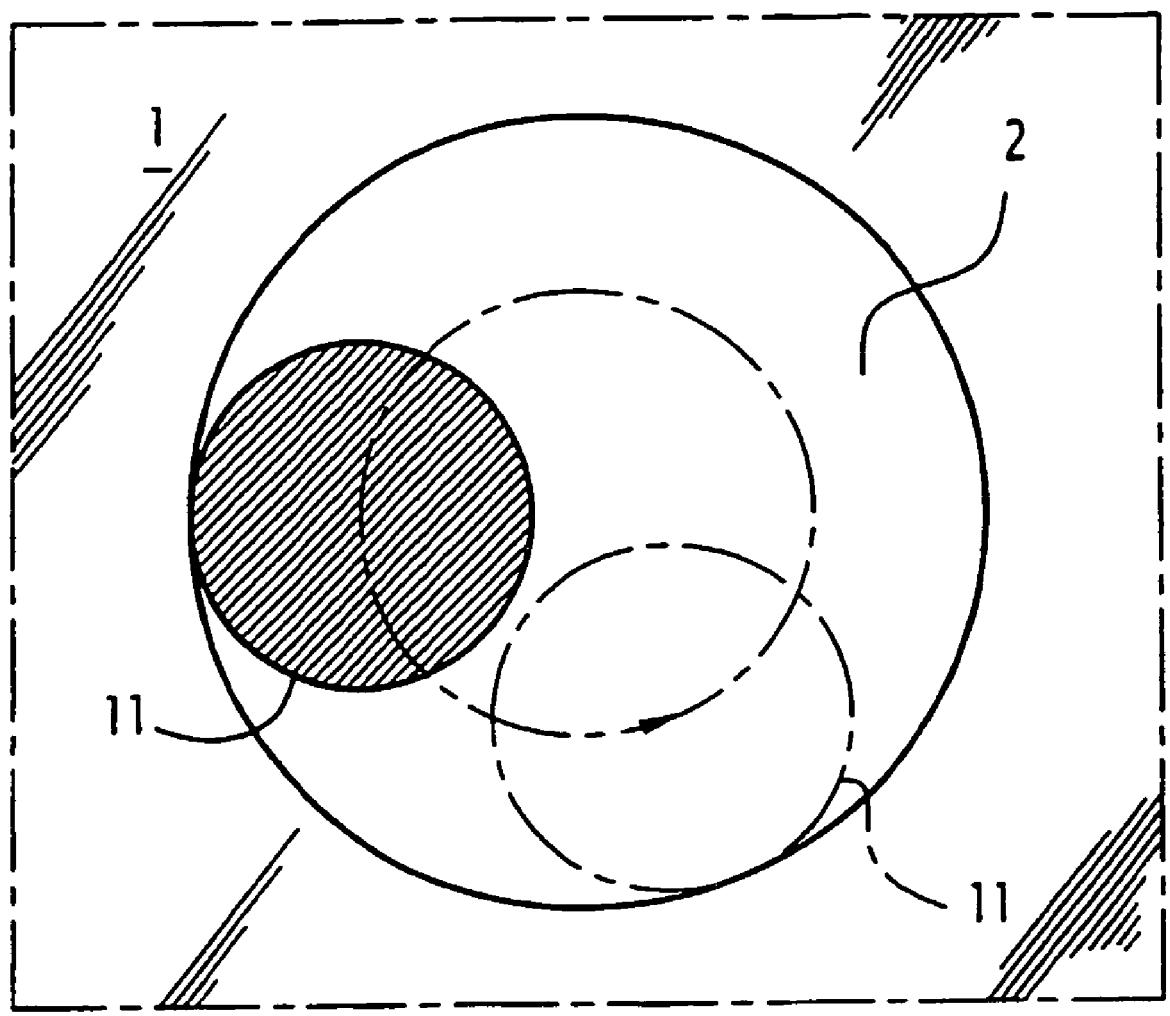
FIG. 4 is a diagrammatic plan view showing the displacement of the electrode in a bore.

As shown in FIG. 4, the orbital movement communicated to the electrode 11 by the machining head 12 enables it to travel all around its circumference of the bore 2 without revolving about its own axis, and imprinting its own shape in said bore 2 by machining so as to make the tapping. These movements are programmed and controlled from the control unit 15 which takes control of the X and Y axes of the machining head 12 and which measures the machining voltage at the electrode 11 for servo-control purposes. The control unit 15 also makes it possible to search for the center in automatic mode by feeding operations so as to initialize the electrode 11 in the center of the bore 2 prior to beginning sequences in operative machining mode. As a function of the pitch of the tapping to be made in the bore 2 and thus as a function of the depth to be reached, the ring 14 placed around the electrode carrier 13 serves to limit movement beyond the values that are to be reached and thus avoids any overshooting of the design measurements and consequently guarantees that the tapping complies with the design depth.

The various passes of the method are preferably performed using a single electrode, and these passes are organized so as to enable the final profile of the tapping in the bore 2 to be obtained with the corresponding surface state. These passes are based on causing the electrode to perform several revolutions at different depths on each pass and with different machining parameters for each revolution of the electrode.

Thus, the electrode 11 is displaced in orbital manner without it revolving about its own axis, and without advance movement being combined with said orbital displacement.

By way of example, the method of making tapping in the bore 2 by means of the electrode 11 comprises:
  a shallow pre-blanking pass at low electrical power serving to "run-in" the electrode 11 in order to avoid any premature damage and to prepare the machining surface prior to moving on to a blanking pass;
  a blanking pass at full electrical power implemented over the major fraction of the depth of the thread of the tapping;
  a semi-finishing pass at very shallow depth and at low electrical power in order to attenuate the effects of the surface state of the blanking pass at full power; and
  a final finishing pass at very low power and very shallow depth and at very low electrical power in order to finalize the profile and reach a good surface state that is free from any microcracking.

During all of these passes, the dielectric fluid circulates between the bore 2 and the electrode 11, either by injection or by suction. Similarly, the electrode 11 is driven to pulsate radially in the bore 2 so as to encourage fluid flow.

During the various machining passes, the parameters mentioned by way of example in the table below were used for making an M18×2 type tapping having an ISO profile.

| Passes | Current A | Pulsation duration µs | Pause time µs | Fluid flow rate L/h | Pulsations Machining s | Withdrawing s | Depth of pass mm |
|---|---|---|---|---|---|---|---|
| Pre-blanking | 24 | 25 | 25 | 20 | 1.6 | 0.1 | 0.6 |
| Blanking | 48 | 50 | 50 | 20 | 1.6 | 0.1 | 1.5 |
| Semi-finishing | 16 | 25 | 25 | 20 | 1.6 | 0.1 | 1.6 |
| Finishing | 8 | 12.8 | 12.8 | 20 | 1.6 | 0.1 | 1.8 |

The method of the invention is applicable to all types of tapping. It makes it possible to provide tapping in compliance with different standards by adapting the profile of the electrode. For a given standard, different values of diameter and different values of pitch can be achieved using a single electrode profile merely by scaling and while retaining the same mode of operation.

The method of the invention for making tapping by electroerosion is applicable to any installation in a hostile medium where machining needs to be performed under remote control, and it applies in particular to nuclear reactors.

The invention claimed is:

1. A method for forming a tapping in a bore comprising the steps:
   (a) inserting an electrode bearing threads into a bore;
   (b) rotating the electrode orbitally without revolving about its own axis at a distinct predetermined depth of the bore around the circumference of the bore while machining corresponding threads on a wall of the bore by electroerosion to initiate the formation of an unfinished tapping in the bore during a first longitudinal pass through the bore wherein the electrode operates at a first set of machining parameters;
   (c) providing a control unit for repeating step (b) a preselected number of times to complete a corresponding number of longitudinal passes through the bore, the machining parameters being varied with each pass until a finished threaded tapping is created; and
   (d) each orbital rotation of the electrode around the circumference of the bore occurring without axial displacement through the bore.

2. The method of claim 1 wherein the passes include a sequence including:
   a pre-blanking pass at low electrical power for machining a partial depth of the tapping thread thereby preparing the bore surface for subsequent machining;
   a blanking pass at frill electrical power for forming a major portion of the depth of the tapping thread;
   a semi-finishing pass at low electrical power affecting a shallow depth of the tapping thread to attenuate the disruption of the surface state of the blanking pass at full power; and
   a final finishing pass at low power affecting a shallow depth of the tapping in order to finalize the tapping evidencing a good surface state that is free from microcracking.

3. The method of claim 1 together with the step of circulating dielectric fluid between the bore and the electrode while the electrode pulsates radially in the bore so as to encourage fluid flow.

4. The method of claim 1 wherein the parameters are chosen from the group including: electrode current amperage, current pulsation duration, pause time, fluid flow rate, fluid pulsation duration, and electrode depth within the bore.

5. An apparatus for forming a tapping in a bore comprising:
   (a) an electrode bearing threads for insertion into a bore;
   (b) machine head means mounting the electrode for causing the electrode to rotate orbitally without revolving about its own axis at a distinct predetermined depth of the bore around the circumference of the bore while machining corresponding threads on a wall of the bore by electroerosion to initiate the formation of an unfinished tapping in the bore during a first longitudinal pass through the bore wherein the electrode operates at a first set of machining parameters;
   (c) a control unit for repeating (b) a preselected number of times to complete a corresponding number of longitudinal passes through the bore, the machining parameters being varied with each pass until a finished threaded tapping is created;
   (d) wherein each orbital rotation of the electrode around the circumference of the bore occurs without axial displacement through the bore.

6. The apparatus of claim 5 wherein the electrode has a diameter that is smaller than the diameter of the bore.

7. The apparatus of claim 5 wherein the electrode includes an axial channel for circulating fluid through the electrode and the bore.

8. The apparatus of claim 7 wherein the fluid is a dielectric fluid.

* * * * *